(12) United States Patent
Sugeta

(10) Patent No.: US 7,477,429 B2
(45) Date of Patent: Jan. 13, 2009

(54) IMAGE READING APPARATUS

(75) Inventor: Mitsuhiro Sugeta, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/022,256

(22) Filed: Jan. 30, 2008

(65) Prior Publication Data

US 2008/0151327 A1    Jun. 26, 2008

Related U.S. Application Data

(62) Division of application No. 10/601,678, filed on Jun. 24, 2003, now Pat. No. 7,349,133.

(30) Foreign Application Priority Data

Jul. 5, 2002    (JP)    ............................. 2002-197864

(51) Int. Cl.
*H04N 1/04*    (2006.01)
(52) U.S. Cl. .................. 358/475; 358/471; 358/483; 358/506; 358/406; 358/504; 362/800; 356/218; 356/229
(58) Field of Classification Search .............. 358/475, 358/471, 483, 406, 504, 506; 362/800; 356/218, 356/229
See application file for complete search history.

(56) References Cited

U.S. PATENT DOCUMENTS

| | | | |
|---|---|---|---|
| 5,313,289 A | 5/1994 | Nagane et al. | 358/475 |
| 5,661,645 A * | 8/1997 | Hochstein | 363/89 |
| 5,969,343 A | 10/1999 | Nakamura et al. | 250/227.31 |
| 6,104,509 A * | 8/2000 | Yoshida | 358/509 |
| 6,376,837 B1 * | 4/2002 | Itabashi et al. | 250/234 |
| 6,452,670 B1 | 9/2002 | Bour et al. | 356/237.1 |
| 6,532,085 B2 | 3/2003 | Fujinawa | 358/475 |
| 6,661,544 B1 | 12/2003 | Okino et al. | 358/506 |
| 6,714,325 B1 | 3/2004 | Okino et al. | 358/497 |
| 6,787,790 B2 | 9/2004 | Shoji | 250/585 |
| 6,888,556 B2 | 5/2005 | Shimomura | 347/129 |
| 6,891,645 B1 | 5/2005 | Nakamura | 358/474 |
| 6,953,263 B1 * | 10/2005 | Fujimoto et al. | 362/227 |

(Continued)

FOREIGN PATENT DOCUMENTS

| | | |
|---|---|---|
| JP | 04-023100 | 1/1992 |

(Continued)

OTHER PUBLICATIONS

Japanese Office Action from counterpart application 2002-197864, dated Mar. 4, 2005.

*Primary Examiner*—Edward L Coles
*Assistant Examiner*—Satwant K Singh
(74) *Attorney, Agent, or Firm*—Fitzpatrick, Cella, Harper & Scinto

(57) ABSTRACT

An image reading apparatus that detects failure in the white LEDs constituting a white LED array. Failure in the white LEDs is detected by comparison between a prescribed current threshold and the current running in the LED array detected by an image reading apparatus controller when the white LED array composed of plural LED blocks connected in parallel, each LED block being composed of plural LEDs connected in series, is powered for failure detection. This failure check is conducted by checking LEDs for failure in each of the LED blocks constituting the LED array. Image reading is not permitted when faulty LEDs are detected in two neighboring LED blocks.

7 Claims, 9 Drawing Sheets

U.S. PATENT DOCUMENTS

| | | | |
|---|---|---|---|
| 7,003,241 B1 | 2/2006 | Kobayashi et al. | 399/72 |
| 7,085,023 B2 * | 8/2006 | Okamoto et al. | 358/471 |
| 7,262,752 B2 * | 8/2007 | Weindorf | 345/82 |
| 2004/0125412 A1 | 7/2004 | Sugeta | 358/474 |

FOREIGN PATENT DOCUMENTS

| | | |
|---|---|---|
| JP | 8-293972 | 11/1996 |
| JP | 9-218661 | 8/1997 |
| JP | 11-275310 | 10/1999 |
| JP | 2000-222686 | 8/2000 |
| JP | 2001-111783 | 4/2001 |
| JP | 2001-308384 | 11/2001 |

\* cited by examiner

IMAGE READING APPARATUS

RELATED APPLICATIONS

This application is a division of co-pending application Ser. No. 10/601,678, filed Jun. 24, 2003, which is incorporated by reference herein in its entirety, as is fully set forth herein, and claims the benefit of priority under 35 U.S.C. § 119, based on Japanese Priority Application No. JP 2002-197864, filed Jul. 5, 2002, which is incorporated by reference herein in its entirety.

BACKGROUND OF THE INVENTION

1. Field of the Invention

The present invention relates to image reading apparatus, and more particularly to an image reading apparatus using light emitting diodes (LEDs) as the light source for document reading and to a control method thereof.

2. Description of the Related Art

As light sources for high-speed image reading apparatus, halogen lamps, fluorescent lamps and xenon tubes have been employed. These light sources, however, have various problems such that they emit a significant amount of heat, that they consume a significant amount of electric power, that they are large and heavy, and that they need time to stabilize light intensity. As a solution to such problems, the white light emitting diode (LED) array is known where two or more white LEDs of low heat generation and low power consumption are arranged in an array.

The white LED array, however, different from halogen lamps, fluorescent lamps and xenon tubes, have a problem that when some LEDs in the array fail it is not easy to spot the faulty LEDs visually.

If some LEDs in the array fail, light intensity may decrease locally. For example, if a certain number of LEDs have failed in one of plural LED blocks constituting the LED array, or if a certain number of LEDs have failed in two neighboring LED blocks, light intensity becomes low locally. Then there will be quality fluctuations in the acquired image data. If an image is printed on paper by a printer based on such image data, image quality becomes uneven in the recorded image and the user may be disappointed.

SUMMARY OF THE INVENTION

One of the objects of the present invention is to provide an image reading apparatus that can detect failure in the LED array and ensure light intensity high enough to scan documents.

A first aspect of the invention is an image reading apparatus comprising an LED array arranged a plurality of LEDs in a line, a driver unit for driving the LED array, a detection unit for detecting failure of the LEDs in each of LED blocks produced by dividing the LED array, and a control unit for prohibiting image reading operation if the detection unit has detected failure of LEDs in two neighboring LED blocks.

In this image reading apparatus, the control unit may prohibit image reading operation if the LED block adjacent to a block where the detection unit has detected any faulty LEDs has any faulty LEDs while may permit image reading operation unless the LED block adjacent to a block where the detection unit has detected any faulty LEDs has any faulty LEDs.

The image reading apparatus may further comprise a failure number detection unit for detecting the number of faulty LEDs in each LED block, and the control unit prohibits image reading operation if the failure number detection unit has detected more than a predetermined number of faulty LEDs in an LED block.

The image reading apparatus may further comprise a display unit for displaying an LED-array failure warning thereon when image reading operation is prohibited by the control unit.

A second aspect of the invention is a control method for an image reading apparatus equipped with an LED array arranged a plurality of LEDs in a line and a driver unit for driving the LED array. This method comprises the steps of detecting failure of the LEDs in each of the LED blocks produced by dividing the LED array, confirming whether the LED block adjacent to the LED block where any failure has been detected is faulty or not, and prohibiting image reading operation if it is confirmed at the confirming step that each of two neighboring LED blocks has any faulty LEDs.

In this prohibiting step, image reading operation may be prohibited if the LED block adjacent to a block where any faulty LEDs have been found in the checking step has any faulty LEDs while image reading operation may be permitted unless the LED block adjacent to a block where any faulty LEDs have been found in the detecting step has any faulty LEDs.

This method may further comprise detecting the number of faulty LEDs in each LED block, wherein in the prohibiting step image reading operation is prohibited if more than a predetermined number of faulty LEDs are found in an LED block in the detecting step.

The method may further comprise displaying an LED-array failure warning when image reading is prohibited.

A third aspect of the invention is an image reading apparatus comprising an LED array arranged a plurality of LEDs in a line, a driver unit for driving the LED array, a detection unit for detecting failure of the LEDs, and a control unit for prohibiting image reading operation if the detection unit has detected a predetermined number or more of faulty LEDs in the vicinity thereof.

This control unit may prohibit image reading operation if the detection unit has detected a predetermined number or more of faulty LEDs in the vicinity thereof while may permit image reading operation unless the detection unit has detected a predetermined number or more of faulty LEDs in the vicinity thereof.

The image reading apparatus may further comprise a display unit for displaying an LED-array failure warning thereon when image reading operation is prohibited by the control unit.

A fourth aspect of the invention is a control method for an image reading apparatus equipped with an LED array arranged a plurality of LEDs in a line and a driver unit for driving the LED array. This method comprises the steps of detecting failure of the LEDs, confirming whether any LED adjacent to a faulty LED is faulty or not, and prohibiting image reading operation if two LEDs in the vicinity thereof are faulty.

In the prohibiting step, image reading operation may be prohibited if a predetermined number or more of faulty LEDs are found in the vicinity thereof while image reading operation may be permitted unless a predetermined number or more of faulty LEDs are found in the vicinity thereof.

This method further comprises the step of displaying an LED-array failure warning when image reading operation is prohibited.

The above and other objects, features, and advantages of the present invention will be more apparent from the following detailed description taken in conjunction with the accompanying drawings.

DETAILED DESCRIPTION OF PREFERRED EMBODIMENTS

Now the embodiments of the present invention will be described in detail below with reference to the accompanying drawings.

First Embodiment

Figure 1:
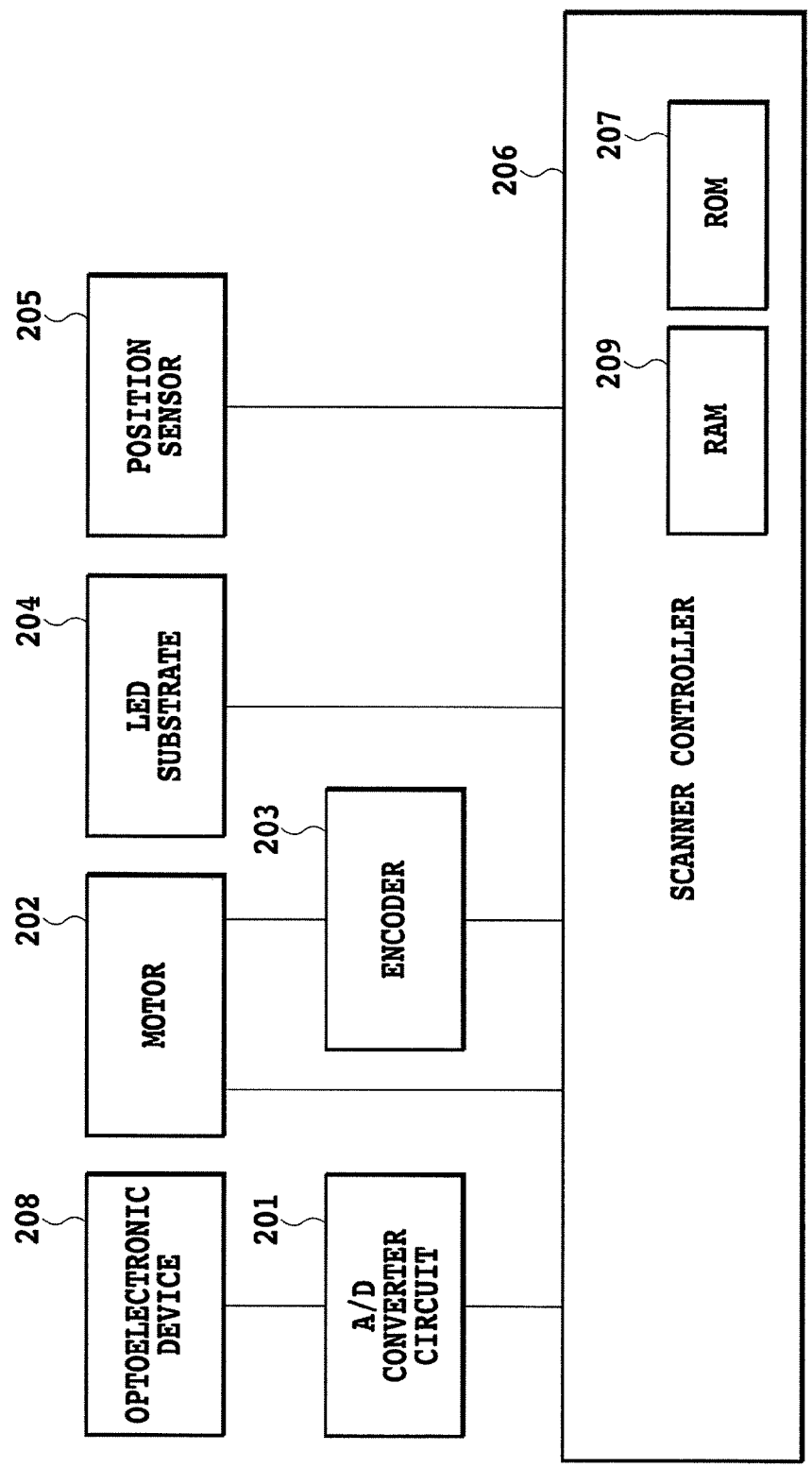
FIG. 1 is a block diagram of a scanner controlling unit of an embodiment in accordance with the present invention.
Figure 3A:
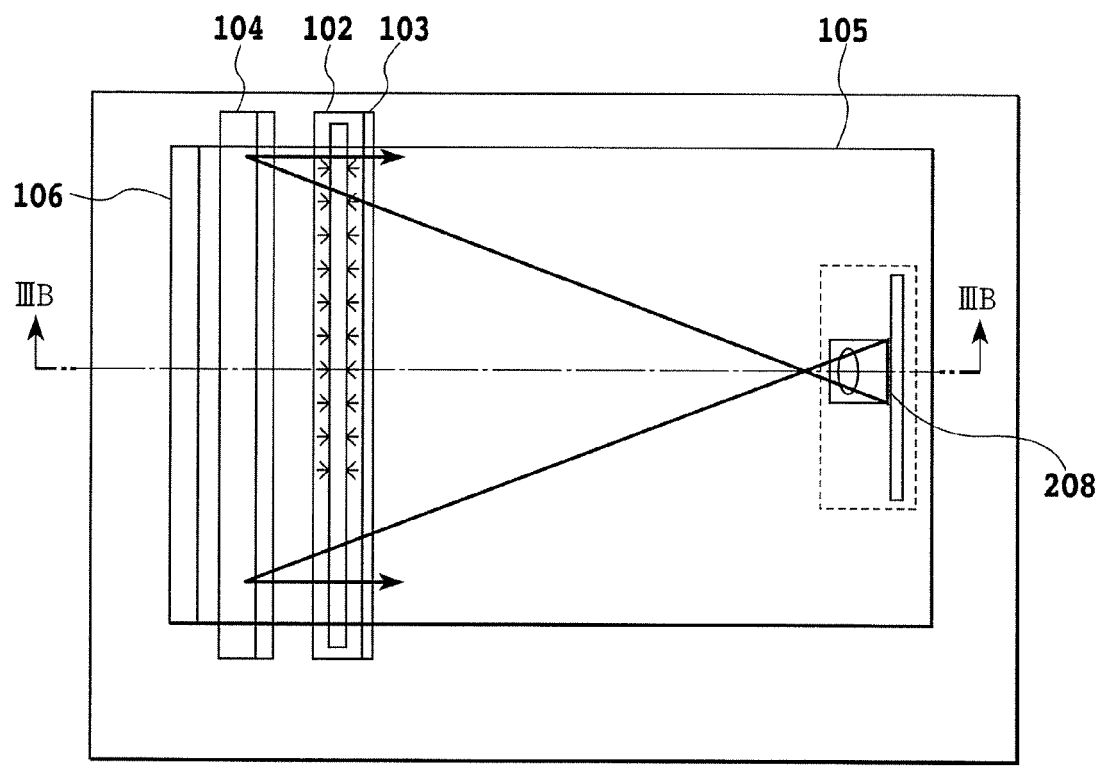
FIG. 3A is a top view of a scanner of an embodiment in accordance with the present invention.
Figure 3B:
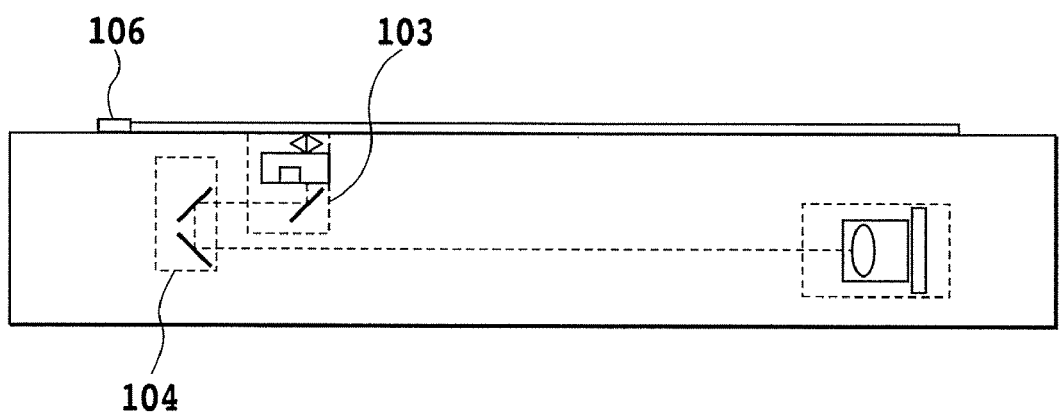
FIG. 3B is a side view sectioned along dashed-and-dotted line in FIG. 3A of the scanner.
Figure 3C:
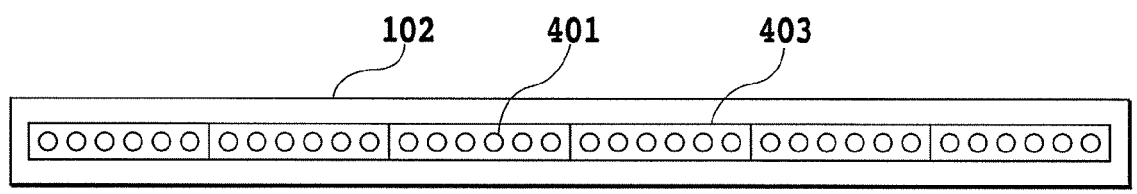
FIG. 3C is an enlarged view of a white LED array of an embodiment in accordance with the present invention.

FIG. 1 is a block diagram of the scanner control unit of the present invention. FIGS. 3A-3C are diagrams illustrating the structure of the scanner; FIG. 3A is its top view; FIG. 3B is its side view; and FIG. 3C is an enlarged view of the white LED array.

First, FIGS. 3A-3C will be described below. A document is placed on a document mount glass plate 105. A white LED array 102 where a plurality of white LEDs are arrayed illuminates the document placed on the document mount glass plate. An optoelectronic transducer 208 converts the light, which is reflected by the document and then led by mirror units 103, 104, into electric signals. A reference white board 106 is used when reading the reference data for shading correction. A cover (not shown) is attached to the document mount glass plate so as to fasten the document thereon and cut external light.

Referring now to FIG. 3C, the white LED array 102 is an array of a plurality of white LED blocks 403 each having-six white LEDs 401.

Figure 4:
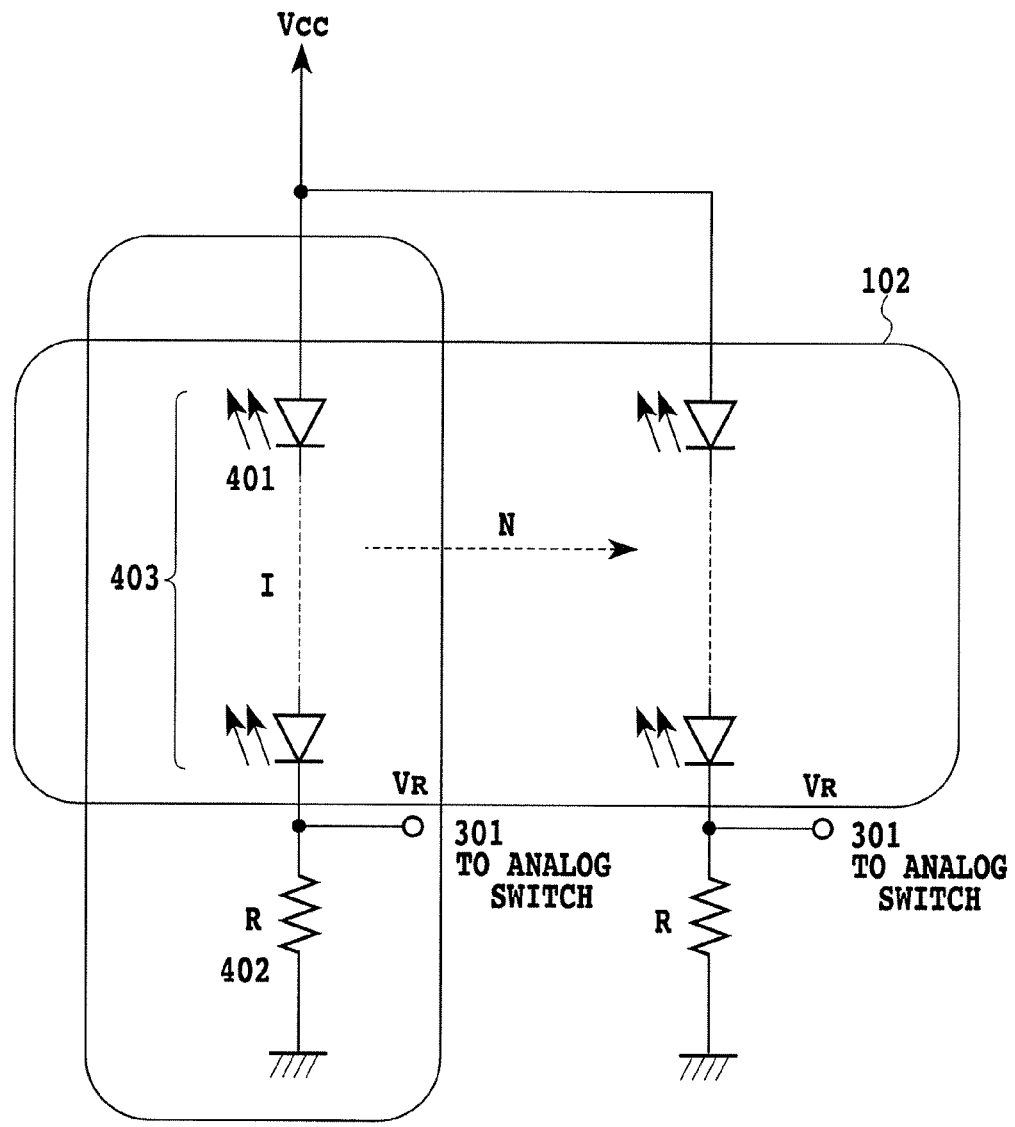
FIG. 4 is a simplified circuit diagram of an LED array of an embodiment in accordance with the present invention.

FIG. 4 is a simplified circuit diagram of the white LED array 102 shown in FIGS. 3A-3C. The circuit of the white LED array 102 comprises white LED blocks 403 that is composed of a plurality of white LEDs 401 and arranged in series in the main scanning direction (longitudinal direction), and a current detection resistor 402 connected to each LED block.

Each LED block 403 is made of as many as I (for example, six) white LEDs 401, and the white LED array 102 is composed of as many as N LED blocks arranged in an array. In other words, as many as I×N white LEDs 401 are arrayed in the main scanning direction to make light intensity uniform over the document illumination area.

As shown in FIG. 4, the white LED array is driven by a constant-voltage driver circuit. The current detection resistor 402 is the resistor that decides the magnitude of current running in the white LEDs, selected in accordance with the light intensity needed in the scanner system. In this embodiment, the current detection resistor 402 is 120[Ω].

Now described briefly is how to detect faulty LEDs. There are an open mode and a short mode as the modes of failure in the LED block. In the open mode of failure, the circuit in the LED block 403 is open somewhere and LEDs do not light up because current does not run. In the short mode of failure, part of LEDs in an LED block 403 are short-circuited and do not light, and the current grows because the resistance in the LED block 403 decreases.

In the open mode, no current runs in the current detection resistor 402. On the other hand, in the short mode, the more short-circuited LEDs in an LED block 403, the more current grows in the current detection resistor 402, compared with the state with no failure. Thus it is possible to estimate the number of faulty LEDs in an LED block 403, based on the amplitude of current running in the current detection resistor 402.

Now FIG. 1 is described. The optoelectronic transducer 208 in FIG. 1 is the same as that shown in FIG. 3A. An A/D converter circuit 201 conducts A/D conversion on the output signals from the optoelectronic transducer 208. A motor 202 moves the mirror units 103, 104 in the sub scan direction (transverse direction in FIGS. 3A-3C).

An encoder 203 is connected to the motor 202. The encoder 203 measures the traveling distance from the start point to the document edge in the sub scan direction.

The white LED substrate 204 has a white LED array 102. A position sensor 205 is used for locating the mirror units 103, 104 in the home positions.

A scanner controller 206 has ROM 207 that stores control programs and RAM 209 used as work area, and controls the individual units of the scanner based on the control programs stored in ROM 207.

Figure 2:
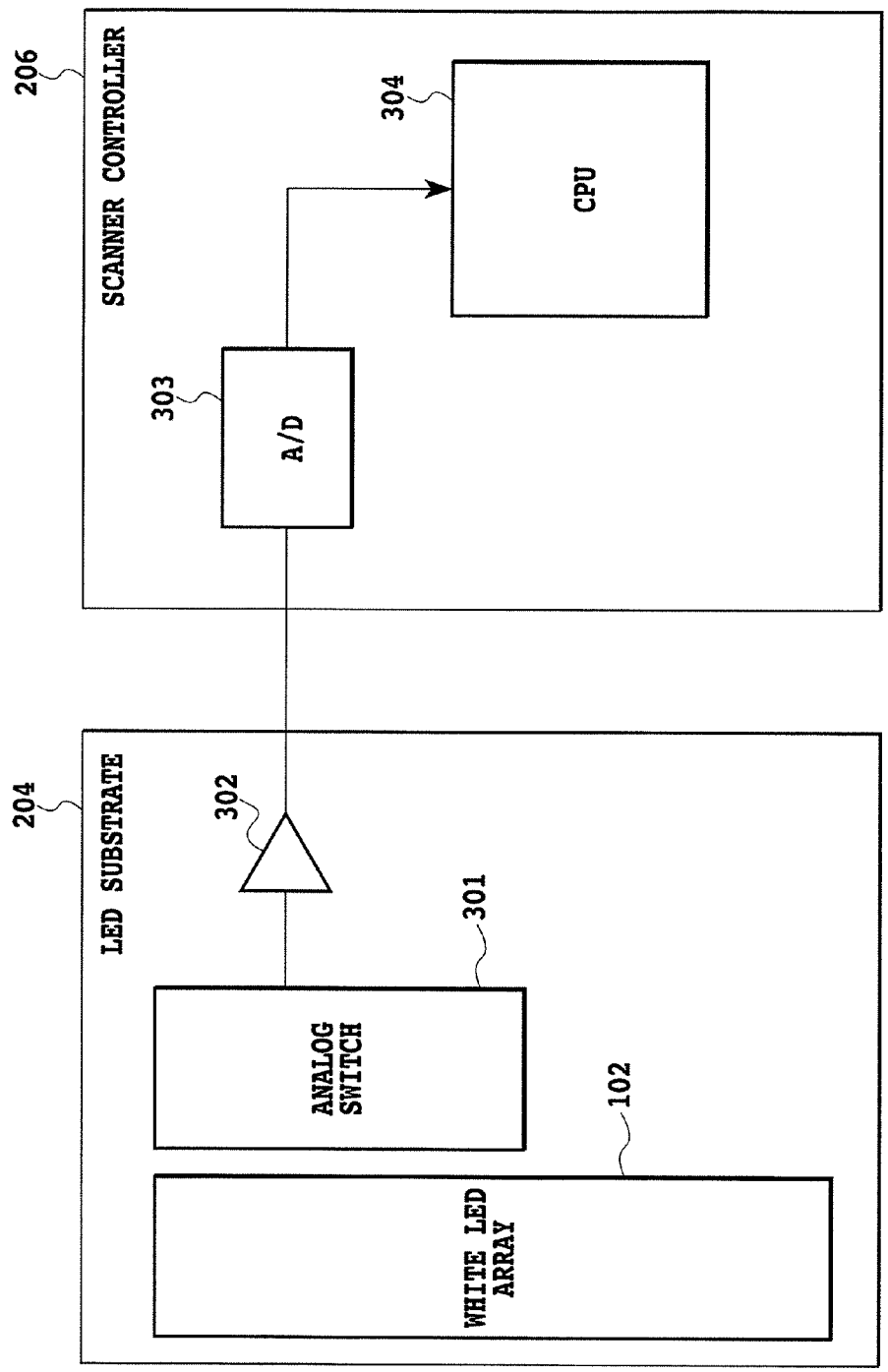
FIG. 2 is a block diagram of a scanner controller and a structure of an LED substrate of an embodiment in accordance with the present invention.

FIG. 2 is a block diagram illustrating the control configuration of the scanner controller 206 and LED substrate 204 of FIG. 1. First, the LED substrate 204 is described. The white LED array 102 is the same as that shown in FIGS. 3A and 3C. An analog switch 301 outputs the analog voltage signal, VR (FIG. 4), of the current detection resistor 402 to the scanner controller 206, switching the LED blocks 403 having white LEDs. An amplifier (amp circuit) 302 amplifies the output signal from the analog switch.

Next, the scanner controller 206 is described. An A/D converter 303 converts analog signals from the amplifier 302 into digital signals. CPU 304 decides whether any while LED fails or not, based on the digital signals from the A/D converter 303 and execution of a control program stored in ROM 207 (FIG. 1).

Based on the digital voltage signal from the A/D converter 303 and the resistance of the current detection resistor 402, CPU 304 calculates the current running in the LED block 403 and current detection resistor 402. By comparing the calculated current value with prescribed thresholds (more than one threshold), CPU 304 decides the number of faulty while LEDs 401 in an LED block 403. Although in this embodiment the current value is calculated, it may be decided with reference to a voltage-current table.

Next described is the document scanning by the scanner. CPU 304 in the scanner controller 206 executes document scan based on a control program stored in ROM 207.

When the operator presses the start key in the operation panel (not shown) to scan the document placed on the document mount glass plate 105, CPU 304 starts control operation and moves the mirror units 103, 104 to their home positions. CPU 304 turns on the white LED array on the white LED substrate 204 and moves the mirror units 103, 104 with a motor 202 to scan the document in the sub scan direction.

The encoder 203 measures the distance from the start point in the sub scan direction. When the encoder 203 has measured the travel distance from the start point to the document edge, the light reflected by the document is detected by the optoelectronic transducer 208. Data read by the optoelectronic transducer 208 is converted by the A/D converter circuit 201 into digital image data and then entered to the scanner controller 206.

The scanner controller 206 compresses the image data produced from the document and then stores the data of individual pages in an image memory (not shown).

Figure 5:
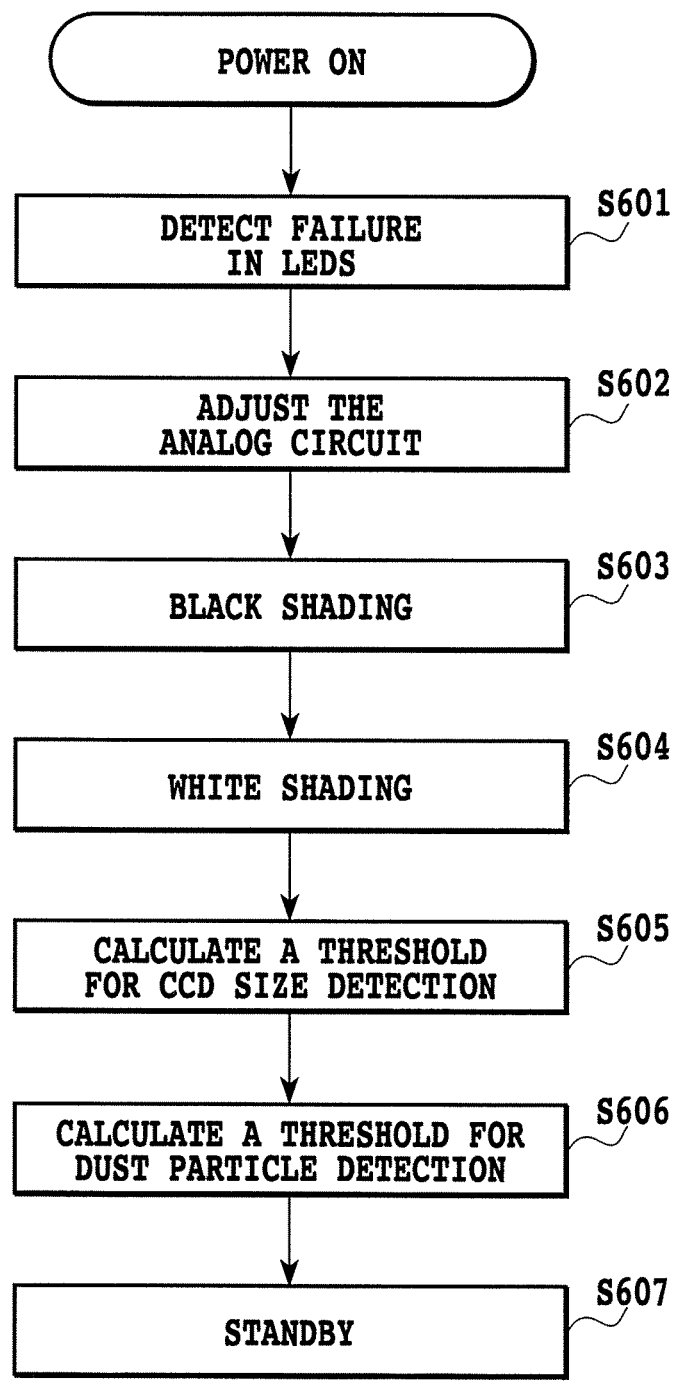
FIG. 5 is a flowchart illustrating control steps from power-on to standby in an embodiment in accordance with the present invention.

Next the control steps from power-on to standby are described with reference to the flowchart of FIG. 5. When powered On, the step of detecting faulty white LEDs is carried out (S601). When the step of detecting faulty white LEDs is completed, initial operations such as analog circuit adjustment (S602), black shading (S603) and white shading (S604) for CCD document size detection, calculation of the thresholds for CCD document size detection (S605) and calculation of the thresholds for dust particle detection in a scanning area (S606) are carried out in this sequence, and then the system enters a standby mode (S607). Here, black shading is a shading correction performed when the LEDs are turned off, while the white shading is a shading correction performed when the LEDs are turned on.

In addition to the time of power-On, the faulty white LED detection may be carried out when the user presses the white LED failure detection key (a dedicated key) in the operation panel. Otherwise, the failure detection may be carried out at certain intervals of scanned document pages.

If the faulty LEDs are detected before adjustments needed for scanning, such as analog circuit adjustment and shading adjustment, there is an advantage that those adjustment steps can be skipped when some LEDs have failed.

Figure 6:
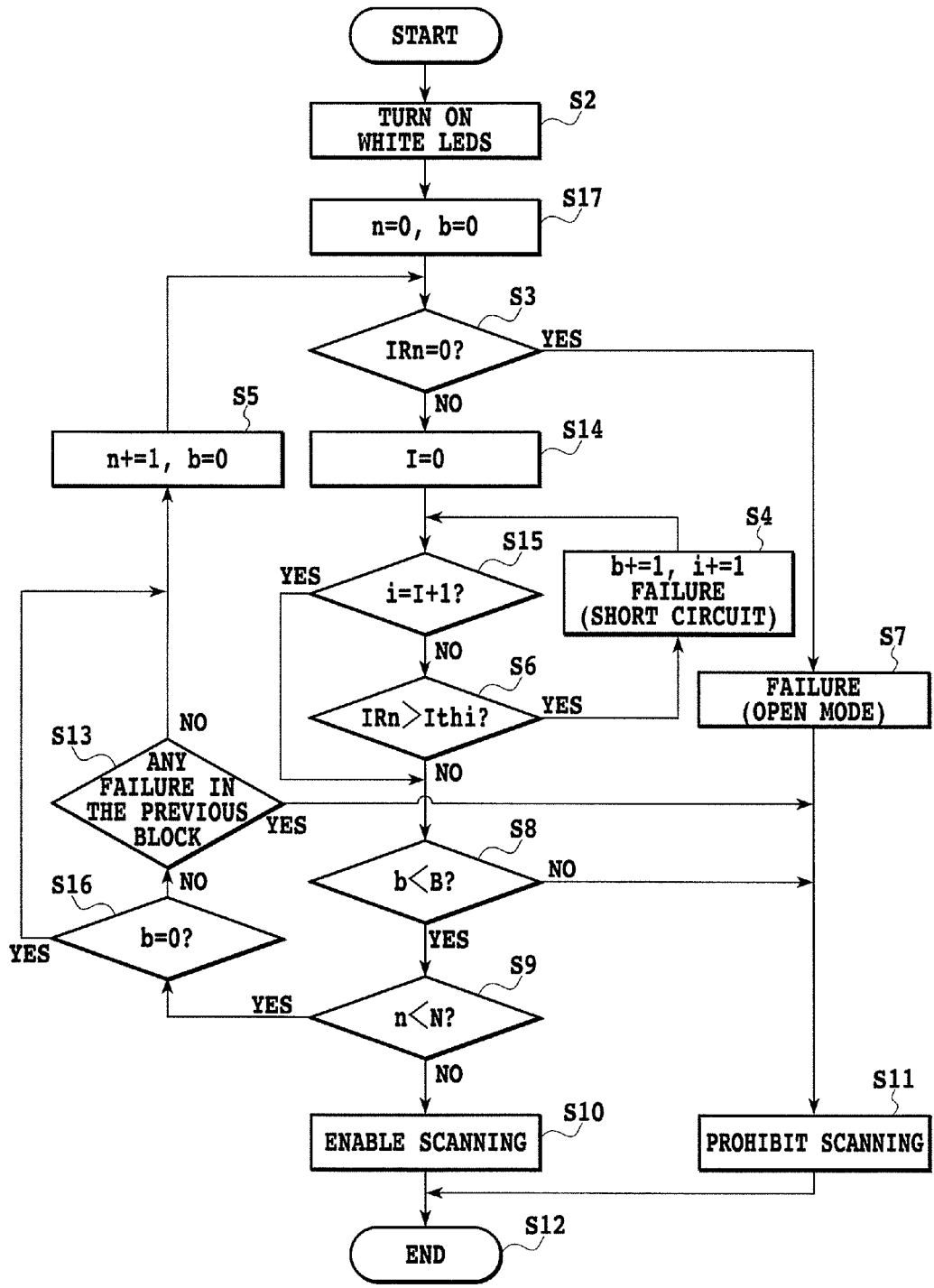
FIG. 6 is a flowchart of steps in a white LED failure detection program of an embodiment in accordance with the present invention.

FIG. 6 is the flowchart of an example of processing executed by the white LED failure detection program stored in ROM 207 of FIG. 1. CPU 304 executes the white LED failure detection based on execution of the white LED failure detection program. As shown in FIG. 6, when powered On, the white LED failure detection is started (S1). Then the white LED array is activated and the white LEDs in all white LED blocks are lit (S2). Then the block counter, n, and the failure counter, b, are initialized (S17). Hereinafter, the failure detection is carried out in the individual LED blocks. Preferably, white LEDs should be lit from one block to another.

As shown in FIG. 2, CPU 304 decides at S3 whether current is running in the current detection resistor 402. Practically, CPU 304 calculates current IRn based on digital voltage signals A/D-converted from voltage signal VR and on the resistance of the current detection resistor 402.

If it is decided that current IRn is not running in the current detection resistor 402 of FIG. 4 (S3), the failure is decided as an open mode failure (S7).

If an open mode failure is detected at S7, or if any of the white LEDs in one LED block does not light up, the document scanning operation is decided as disable (S11). Then a warning that the white LEDs are out of use is shown on the display (not shown) of the scanner, and the failure detection is completed (S12).

On the other hand, if it is decided that any current is running in the current detection resistor 402 (S3), then it is decided whether more than a predetermined number of LEDs in each block have failed or not.

First i is set at zero (S14). Then, it is decided whether the current value, IRn, calculated by CPU 304 exceeds a prescribed threshold Ithi or not (S6). As described later with respect to Table 1, more than one value is set in the current threshold, Ithi, to decide the number of faulty white LEDs.

At S6, it is decided whether current IRn calculated by CPU 304 exceeds Ith0 or not. Then the failure counter b increments i by one, and if the current value exceeds Ith0, the LED failure is decided as a short mode failure and the failure counter, b, increments by one (S4). It is found at S6 that at least one white LED has failed in an LED block 403.

If it is decided at S6 that the current value calculated by CPU 304 exceeds Ith0, the failure counter b increments by one and "i" in current threshold Ithi is increased by one (S4). Namely, current threshold is changed from Ith0 to Ith1. Again at S6, the current value calculated by CPU 304 is compared with current threshold Ith1.

S6 and S4 are repeated as long as the calculated current is higher than the threshold as a result of the comparison at S6. This process may be therefore repeated I times (S15) if there are as many as I white LEDs in each LED block. If this process is repeated I times, this means that all the white LEDs 401 in the LED block 403 are short-circuited.

When the current running in the current detection resistor 402 no longer exceeds current threshold Ithi, the number of faulty white LEDs 401 in the LED block 403 is decided through comparison between failure counter b and failure threshold B.

Next, failure counter b is compared with failure threshold B (S8). At S8, if the count in failure counter b is larger than failure threshold B for an LED block, or at least as many as B white LEDs 401 are decided to be faulty, this means that more than the predetermined number of adjacent white LEDs have failed and an enough large amount of light is not provided for document scanning. Then B=2 in this embodiment.

At S11, it is decided that document scanning is impossible to do. Then a warning that the white LEDs are out of use is shown on the display (not shown) of the scanner, and the failure detection process is completed (S12).

Meanwhile, if the count of failure counter b is smaller than failure threshold B for an LED block, the step proceeds to S9. At S9, it is decided whether the failure detection has been conducted on all the LED blocks constituting the LED array. If the failure detection has been conducted on all the LED blocks, the step proceeds to S10 and it is decided that document scanning can be carried out. Then the failure detection process is completed. Thereby the failure detection is repeated as many as N times for the LED block 403.

If the failure detection is not conducted on all the LED blocks at S9, it is decided whether a predetermined number of LEDs in the neighboring LED blocks are faulty or not.

First it is checked whether the count of failure counter b is zero or not at S16. If the count in failure counter b is zero, the step proceeds to S5 to save the count, b, in memory, and the failure detection is conducted on the next LED block.

Unless the count of failure counter b is zero at S14, it is decided that the previous LED block contains a faulty LED or not (S13). If no faulty LED is detected at S13, the step proceeds to S5 to save the count, b, in memory, and the failure detection is conducted on the next LED block.

The count b stored at S5 will be used for the failure detection for the next block.

If any faulty LED is detected at S13, the step proceeds to S11 and it is decided that document scanning is prohibited. Namely, if each of any neighboring LED blocks has at least one faulty white LED, it is detected that document scanning is impossible. Then a warning that the white LEDs are out of use is shown on the display (not shown) of the scanner. Finally, the failure detection process is completed (S12).

In this way, if each of any neighboring LED blocks has at least one faulty white LED, there will be an area where light intensity is not high enough. Particularly if white LEDs near the boundary between two adjacent LED blocks fail, there will be a local spot where light intensity is not high enough. Namely, the light source has intensity fluctuations during the illumination of the document.

Now an example of current threshold Ithi and failure threshold B is described. Current threshold Ithi and failure threshold B are set here under an assumption that each LED block has six white LEDs. First, the current threshold is a value used in deciding the number of faulty white LEDs in each LED block. If Vcc is 24[V], the forward dc voltage is 3.6[V] and the current is 20 [mA] for each white LED, the current detection resistance becomes 120[Ω]. Table 1 shows current thresholds Ithi provided under such conditions. The value for each current threshold is set to be larger by 5 mA than the actual current shown in parentheses. This is because the influence of signal fluctuations upon conversion of analog voltage signals from the current detection resistor 402 into digital voltage signals is taken into account.

TABLE 1

| Current threshold Ithi | Current [mA] |
| --- | --- |
| Ith0 (current when no LED has failed) | 25 (20) |
| Ith1 (current when at least one LED has failed) | 55 (50) |
| Ith2 (current when at least two LEDs have failed) | 85 (80) |
| Ith3 (current when at least three LEDs have failed) | 115 (110) |
| Ith4 (current when at least four LEDs have failed) | 145 (140) |
| Ith5 (current when at least five LEDs have failed) | 175 (170) |
| Ith6 (current when at least six LEDs have failed) | 205 (200) |

Failure threshold B is the value corresponding to the number of faulty white LEDs in the LED block that will affect document scanning. In this embodiment, the scanner is decided as faulty if at least two LEDs are faulty in an LED block because the light intensity becomes nonuniform. Thus failure threshold B is set at B=2.

Second Embodiment

This embodiment is different from the first embodiment in the way of detecting failure in the white LED block, but they have the other configurations shown in FIGS. 1-5 in common. Specifically, in this embodiment, all the LED blocks of the white LED array are lit under the reference white board 106, the light reflected on the reference white board 106 is converted into an electric signal by the optoelectronic transducer 208, and then whether any white LED is faulty or not is decided from the value obtained from this electric signal. Now this method is described in more detail below.

Figure 7:
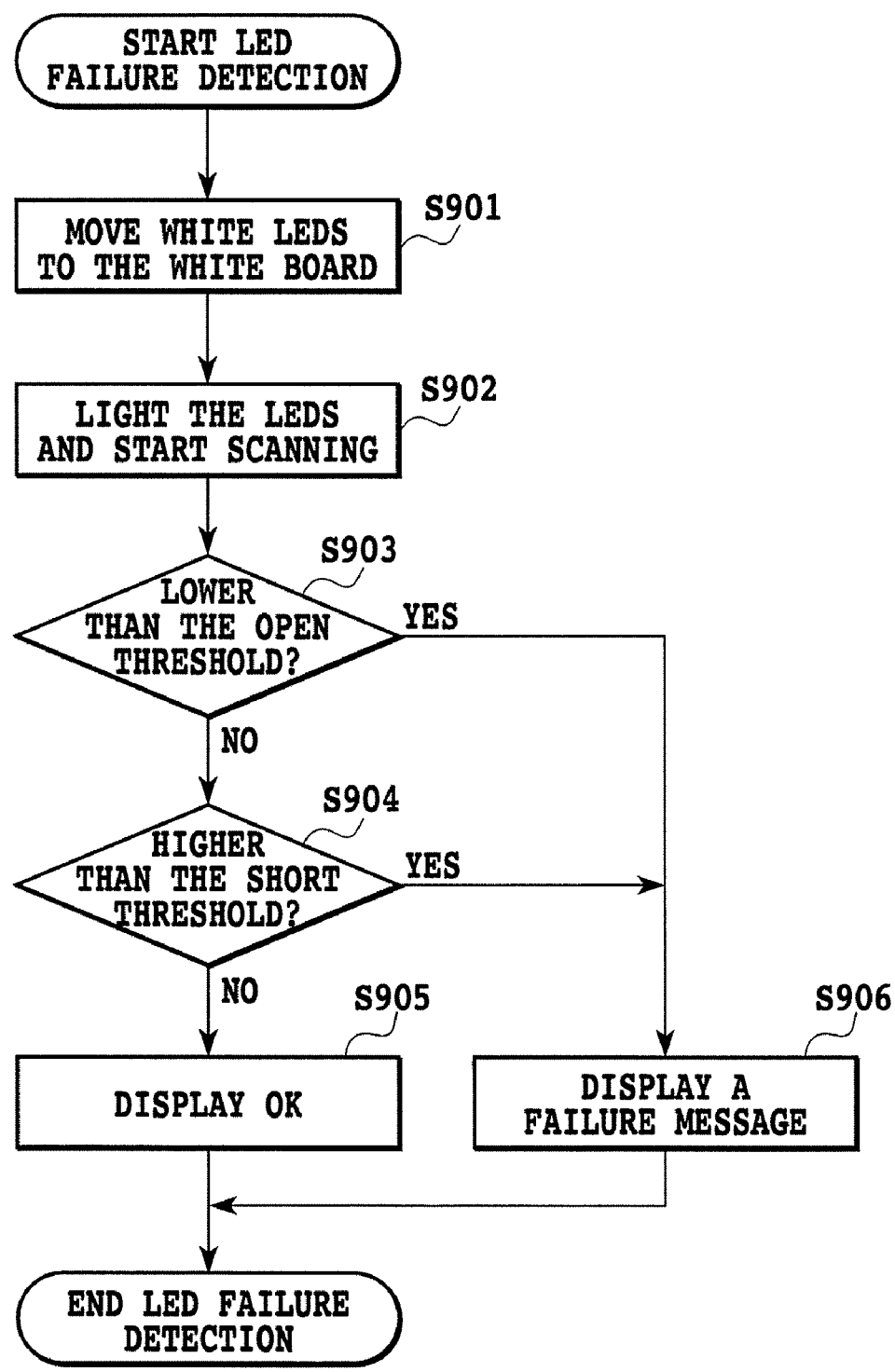
FIG. 7 is a flowchart of the steps in a white LED failure detection program of an embodiment in accordance with the present invention.

FIG. 7 is an example of the process executed in this embodiment by the white LED failure detection program stored in ROM 207 of FIG. 1. When powered On, the mirror units 103, 104 are moved to the position of the reference white board 406 (S901). Then the white LED array is lit, the light reflected on the reference white board 406 is detected by the optoelectronic transducer 208, and the controller 206 stores in RAM 209 the readout obtained by A/D conversion of the reflected light in the A/D conversion circuit 201 (S902).

Next, it is decided whether the readout in RAM 209 is smaller than the open threshold provided, or whether the white LED has failed in the open mode or not (S903). If the readout is decided to be smaller than the open threshold (namely, it is decided that any white LED does not light up), a failure message is shown (S906). In the case of a failure of the open mode, since the white LEDs do not light up, the open threshold becomes very close to that for black data, or data scanned when the LEDs are turned off.

On the other hand, unless the readout is not smaller than the open threshold, the step proceeds to S904. Next decided is whether the readout in RAM 209 is larger than the short threshold provided when any white LEDs are short-circuited (namely, whether any white LEDs are faulty in the short mode) (S904).

In this embodiment, the short threshold is set at a value that is slightly larger than the data of reflection light produced when neighboring white LEDs are faulty in an LED block. The reasons are as follows.

When a white LED is faulty because of short circuit, the current becomes larger than the regular value and the rest LEDs light up brighter than usual. Thus one or so faulty LEDs will be no problem to the scanner. However, if any neighboring white LEDs have failed, the local light intensity is significantly lowered there and the image is much distorted because of a shortage of light intensity. Thus the short threshold is set at a value slightly larger than the data of reflection light produced when two adjacent white LEDs are faulty.

If the readout of the reference white board is larger than the short threshold, the scanner is decided as faulty at S904 and a failure message is displayed (S906).

If no failure is detected in the above failure detection sequence, a message of no failure is displayed (S905).

According to the above method for detecting faulty white LEDs, each block can be checked for faulty LEDs by lighting all the blocks at the same time. Further, failure check can be performed for each block by lighting the blocks one by one.

Because any failure in the LED array can be detected as described above, the present invention can detect any failure in the LED array in the scanner with appropriate timing.

Furthermore, because the LEDs are checked for failure on a block-by-block basis, failure check can be done quickly, compared with the method of checking each LED for failure on a one-by-one basis.

The present invention has been described in detail with respect to preferred embodiments, and it will now be apparent from the foregoing to those skilled in the art that changes and modifications may be made without departing from the present invention in its broader aspects, and it is the intention, therefore, in the appended claims to cover all such changes and modifications as fall within the true spirit of the present invention.

What is claimed is:

1. An image reading apparatus comprising:
   a lighting unit configured to light a document, wherein the lighting unit includes a plurality of LED blocks arranged in a line, and wherein each of the plurality of LED blocks includes a plurality of LEDs in a line,
   a detecting unit configured to detect an existence of an unlighted LED in a said LED block;

a reading unit configured to read a document; and a control unit configured to control the reading unit;

wherein in a case in which the detecting unit detects the existence of at least one unlighted LED in an LED block that is adjacent to another LED block in which the existence of unlighted LED is detected by the detecting unit, the control unit prohibits the reading unit from reading a document.

2. The image reading apparatus according to claim 1, wherein the detecting unit includes a current-detecting unit configured to detect a value of current in the plurality of LED blocks, and wherein the detecting unit can detect the existence of at least one unlighted LED in the LED block based on a current value detected by the current-detecting unit and a threshold value corresponding to the current value in a case where the existence of unlighted LED is not detected.

3. The image reading apparatus according to claim 1, wherein the detecting unit detects the number of unlighted LEDs in each of the plurality of LED blocks, and wherein in a case in which the number of LEDs detected by the detecting unit is larger than or equal to a predetermined value larger than 1, the control unit prohibits the reading unit from reading a document.

4. The image reading apparatus according to claim 3, wherein in a case in which the LED blocks each including at least one unlighted LED are not arranged next to each other and the number of the detected LEDs is lower than the predetermined value, the control unit permits the reading unit to read a document.

5. The image reading apparatus according to claim 3, wherein the detecting unit includes a current-detecting unit configured to detect a value of current running in each of LED blocks, and wherein the detecting unit detects the number of unlighted LEDs based on the detected current value and a plurality of threshold values corresponding to numbers of unlighted LEDs.

6. An image reading apparatus comprising:

a lighting unit configured to light a document, wherein the lighting unit includes a plurality of LED blocks arranged in a line, and wherein each of the plurality of LED blocks includes a plurality of LEDs in a line, a detecting unit configured to detect a number of unlighted LEDs in the plurality of LED blocks;

a reading unit configured to read a document; and a control unit configured to control the reading unit;

wherein in a case in which a number of LED blocks having unlighted LEDs are detected by the detecting unit is larger than or equal to a predetermined number larger than 1, the control unit prohibits the reading unit from reading a document.

7. The image reading apparatus according to claim 6, wherein the detecting unit includes a current-detecting unit configured to detect a value of current running in the plurality of LED blocks, and wherein the detecting unit detects the number of unlighted LEDs based on the detected current value and a plurality of current threshold values corresponding to numbers of unlighted LEDs.

* * * * *